UNITED STATES PATENT OFFICE.

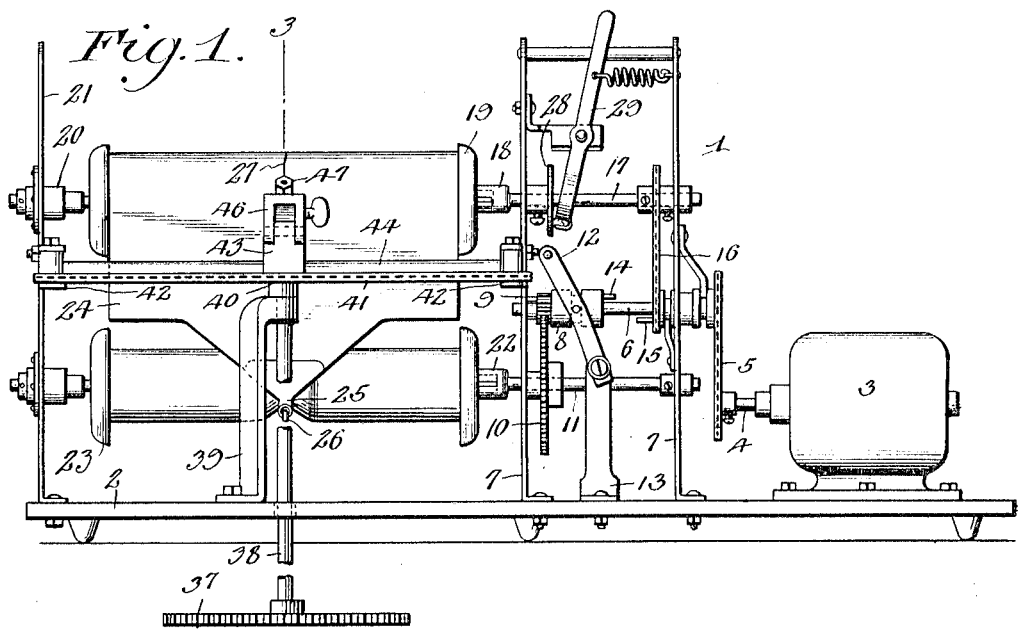
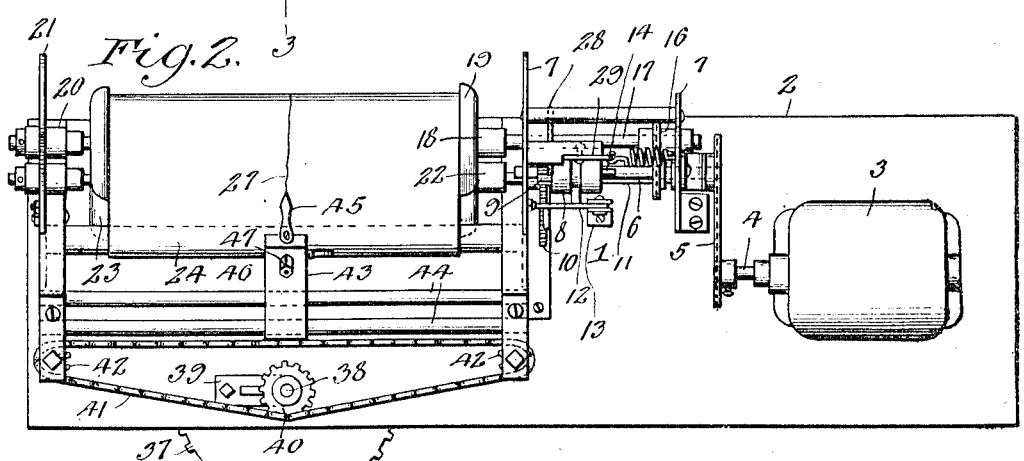
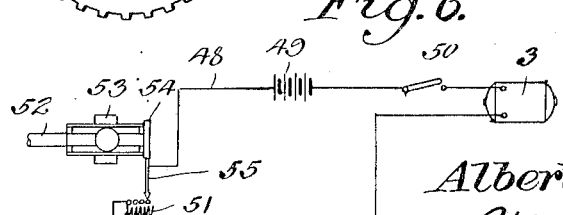

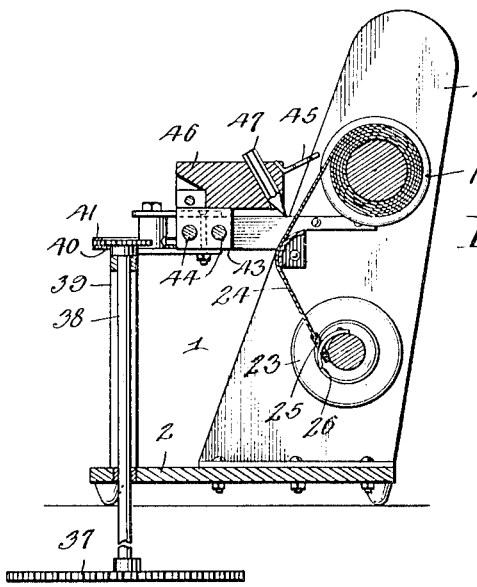
Fig.3.
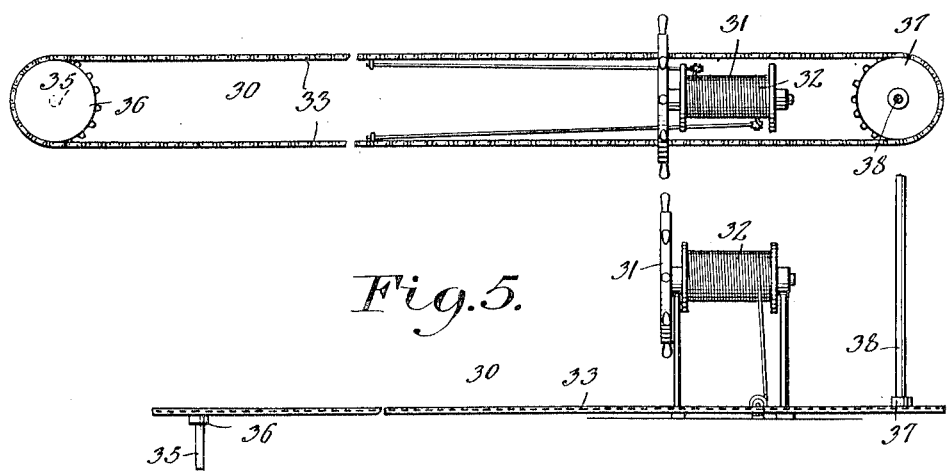
Fig.4.
Fig.5.
INVENTOR
Albert E. Larrabee,
BY Victor J. Evans
ATTORNEY
WITNESS

ALBERT E. LARRABEE, OF BRISTOL, PENNSYLVANIA.

NAVIGATING APPARATUS.

1,270,176.

Specification of Letters Patent.   Patented June 18, 1918.

Application filed July 3, 1917.   Serial No. 178,434.

*To all whom it may concern:*

Be it known that I, ALBERT E. LARRABEE, a citizen of the United States, residing at Bristol, in the county of Bucks and State of Pennsylvania, have invented new and useful Improvements in Navigating Apparatus, of which the following is a specification.

This invention has particular reference to ship-steering mechanism, and has for an object to provide mechanism for automatically governing the course of a ship over a prescribed route or body of water.

Another object of the invention is to provide a movable chart, adapted to be positioned within the pilot house of a ship, and having the course the ship should follow defined thereon, a movable pointer is adapted to follow the course indications of the chart, and is controlled by the movements of the ship's helm, whereby when the pointer is operated to closely follow the course line of the chart, the rudder of the ship will be responsive to the movement of the pointer, so that the ship will be steered in accordance with the directions disclosed by the chart.

A further object is to provide novel means for moving the chart, said means including an electrical motor which is isochronously operable in conjunction with the ship's engine, in order that the chart will move in direct proportion to the speed of said engine.

Other objects will be in part obvious and in part pointed out hereinafter.

The invention accordingly consists in the features of construction, combination of elements and arrangement of parts, hereinafter fully described and pointed out with particularity in the appended claims.

In the drawings—
Figure 1 is a front elevation of the preferred form of the ship-steering mechanism comprising the present invention.

Fig. 2 is a top plan view thereof.

Fig. 3 is a transverse sectional view, taken along the line 3—3 of Fig. 1.

Fig. 4 is a diagrammatic top plan view illustrating the connections between the steering mechanism and the helm and rudder elements of a ship.
Fig. 5 is a side elevation, and Fig. 6 is a diagrammatic view illustrating the electrical connections between the motor of the steering mechanism, and a ship's engine shaft.

Similar characters of reference denote corresponding parts throughout the several views of the drawings.

Referring more particularly to the drawings, the ship-steering mechanism 1, comprising the present invention, preferably includes a suitable base 2, upon which is mounted an electrical motor 3. The armature shaft 4 of the motor is provided with a sprocket wheel, over which is trained an endless chain 5, the latter also being trained over a similar sprocket wheel, mounted upon one end of a rotatable shaft 6. The latter is supported for rotation within fixed uprights or brackets 7, secured to the base 2, and it will be seen that when the motor 3 is in operation, movement will be imparted to the shaft 6. Slidably keyed to the shaft 6 is a collar 8, having a pinion 9 formed therewith, the latter being adapted to mesh with an enlarged gear 10 secured to a roll-bearing shaft 11, the latter also being supported for rotation within the brackets 7, and is located immediately beneath the shaft 6. In order to throw the pinion 9 out of mesh with the gear 10, the collar 8 is provided with an annular groove, into which projects a stud carried by the shifting lever 12, the latter being pivotally secured to a bracket 13 carried by the base 2. It will be seen that by oscillating the lever 12, the pinion 9 will be moved to a position independent of the gear 10, in order to prevent the transmission of movement from the motor 3 to the shaft 11, for a purpose to be presently disclosed.

The collar 8 is also provided with a stud 14, which is adapted to engage with a similar element 15, carried upon a sprocket wheel, the latter being loosely mounted upon the shaft 6, whereby when the collar 8 is moved, by the manipulation of the lever 12, the stud 14 will be brought into engagement with the element 15, thus effecting the rotation of the sprocket carrying the element 15 in unison with the shaft 6, as will be clearly understood. A chain 16 is trained over the latter sprocket, and extends to a similar wheel fixed to a horizontally extending shaft 17, the latter being journaled within the brackets 7 and mounted above the shaft 6, as shown. The shaft 17 is provided with a socket extremity 18, which is adapted to receive the squared end of a chart-carrying roll 19. The other extremity of the roll 19 is mounted within a spring bearing 20, formed with a bracket 21. By this construction it will be seen that the roll 19 is removable from the mechanism 1, that is, by moving the chart laterally toward the bearing 20, the other extremity thereof may be disconnected from the socket 18 of the shaft 17, and thus removed from said mechanism.

From the foregoing it will be seen that the movement of the motor 3 may be imparted to the roll 19 by forcing the stud 14 of the collar 8 into engagement with the element 15, so as to connect the shafts 6 and 17 for synchronous rotation. The outer end of the shaft 11 is also provided with a squared socket 22, into which is adapted to be inserted the reduced squared extremity of a second chart roll 23, which is similar in construction and in operation to the roll 19, and is removable from the mechanism 1.

A chart 24 is secured to the roll 19, and is provided with a reduced apertured extremity 25, which is adapted to engage with a hook element 26 secured to the roll 23. It will be evident that when the pinion 9 is in engagement with the gear 10, the roll 23 will be in position to be rotated by the motor 3, thus causing the chart 24 to be unwound from the roll 19, and wound about the roll 23. An irregular chart line or course-indicating indicia 27 is impressed, printed or otherwise designated on the chart 24, and means are provided by the present invention to control the rudder of a ship in accordance with the instructions or conditions denoted by said line, as will be hereinafter fully set forth. The shaft 17 carries a disk 28 against which is resiliently pressed a lever 29, the latter being employed to permit the chart 24 to be unwound from the roll 19 in a regulated and taut manner.

The mechanism above described is used in connection with the helm 30 of a ship, the latter consisting of the usual windlass 31, about which is wrapped a cable 32. The latter is connected in any suitable manner with a rudder-operating chain 33. It will be seen that by revolving the helm 30 the chain 33 may be moved in any desired direction, so as to effect a control movement of a rudder 34. The rudder is provided with a shaft 35, carrying at its upper end a sprocket 36, the chain 33 being trained over said sprocket, so that the movement of the helm will be imparted thereto. The chain 33 is also trained over a second sprocket 37, which is carried upon the lower end of a vertically journaled shaft 38, forming a part of the mechanism 1. The shaft 38 is supported for rotation within a bracket 39 mounted upon the base 2, and the upper end thereof has secured thereto a sprocket wheel 40.

An endless chain 41 meshes with the wheel 40 and is also trained over guide sprockets 42, carried by the brackets 7 and 21, thus it will be evident that the movement of the helm 30 will be synchronously imparted to the chain 41 and to the rudder 34. Connected in any suitable manner to the chain 41 is a pointer block 43, which is adapted to slide upon supporting rods 44, extending between the brackets 7 and 21, whereby the movement of the chain 41 and the block 43 will be in unison. A pointer hand 45 is formed with the block 43 and extends to a position immediately adjacent to the roll 19, so that it may closely follow the chart line 27 indicated upon the movable chart 24. The block 43 is provided with a pivoted upper section 46, which may be thrown back so as to permit the roll 23 to be removed from the brackets 7 and 21. A pencil or the like 47 is adjustably carried by the upper section 46, and is adapted to be moved into engagement with the chart 24, when the latter is being initially made.

In operation, the pilot of a ship manipulates the helm 30 so that the hand 45 of the block 43 will be caused to follow the chart line 27. It will be seen that in doing this the rudder 34 will be maintained in positions accurately guiding the movement of the ship, with which it is associated. The chart 24 is initially made by lowering the pencil 47 or the like so that the latter will bear upon a chart carried by the rolls. Then during the manipulation of the helm 30, the movements thereof will be imparted and recorded by the moving chart, so that after the chart has been once made by an experienced pilot, the ship may be steered thereafter by relatively inexperienced pilots. After the roll has been unwound, the same may be quickly restored to its initial condition by throwing the collar 8 so that the stud 14 thereof will engage with the element 15, this results in imparting power to the roll 19 so as to rewind the chart 24 upon the roll 19. Due to the removable nature of the roll 19, different charts may be employed by the mechanism 1.

The motor 3 is preferably of an electrical type, although it should be understood that other means may be employed for effecting the rotation of the shaft 6. In this instance, however, the motor 3 forms a part of an electrical circuit 48, including a source of electrical energy 49 and a cut-out switch 50. A rheostat 51 is provided in the circuit 48, and is employed to control the movement of current entering the motor 3, so that the speed of the latter may be readily controlled. In order to control the rheostat in an automatic manner, in connection with an engine-driven shaft 52, use is made of a governor 53, which is mounted upon the shaft 52. A sliding collar 54 forms a part of the governor and is loosely mounted upon the shaft 52. It will be seen that when the said shaft is revolving at full speed, the governor will be extended so as to draw the collar 54 along the shaft 52, and this movement is imparted to the rheostat handle 55, so that the said rheostat will be operated to permit the motor 3 to receive a full supply of current. However, when the shaft 52 is revolving at a lower rate of speed, the governor will have a tendency to contract, which will force the handle 55 to a position diminishing the supply of current to the motor 3. Thus causing the latter to revolve at a somewhat reduced rate of speed. And when the shaft 52 is idle, the rheostat will be operated to cut off the supply of current to the motor. Thus it will be seen that the motor 3 will revolve, in speed, in direct proportion to the speed of the shaft 52.

From the foregoing it will be seen that there is provided mechanism whereby the objects of the present invention have been achieved, and that all of the advantageous features above mentioned are, among others, present. The mechanism is particularly advantageous when employed upon ferry boats and like vessels, and is to be especially employed in foggy unfavorable weather conditions, or when a ship is navigating by night. It will be noted that by having the motor 3 isochronously responsive to the speed of the ship's engine shaft, the movement of the chart will be in direct proportion to the speed the ship is traveling, thereby rendering the chart reliable and accurate at all times, and insuring a safe passage of the ship to an objective point or destination. By using the navigating mechanism 1, a ship may be piloted by relatively inexperienced persons, with substantially the same skill and precision as if controlled by an experienced pilot. The charts are removable from the mechanism, so that charts defining other courses may be substituted in place thereof.

In view of the foregoing, it is thought that the construction and operation of the present invention will be clearly understood by those versed in the art, and therefore, a more extended explanation relative thereto has been accordingly omitted.

Having described the invention what is claimed as new and patentable is:

1. In ship navigating apparatus, the combination with a movable chart, of driving means responsive to the speed of the ship's engine for effecting the movement of said chart, an index element shiftable across said chart, and flexible connections extending from said element to a rudder-controlling helm, whereby upon the movement of the latter said element will be synchronously actuated.

2. In ship navigating apparatus, the combination with a movable chart having a course line defined thereon, of a follower laterally movable with regard to said chart and adapted to be actuated to coincide with said line, and flexible connections extending from said follower to a rudder-controlling helm, whereby the latter may be manipulated to various rudder-shifting positions governed by the registering of said follower with said chart line.

3. In ship-steering mechanism, the combination with the rudder-controlling mechanism of a ship, of a slidable and pivotally mounted index element movable in unison with said mechanism, and a movable chart having course indicia defined thereon, whereby the movement of said mechanism will be governed by the coinciding of said index element with the course indicia of said chart.

4. In ship-steering apparatus, the combination with the rudder-actuating helm of a ship, of a motor-driven chart having course indicia defined thereon, a shiftable follower movable in unison with said helm, and motion-imparting chain and gear connections extending between said follower and helm, whereby the rudder-controlling movement of the latter will be governed by the registering of said follower with the course indicia of said chart.

5. In ship-steering mechanism of the class described, the combination with the rudder-operating helm of a ship, of a movable chart having a course line disclosed thereon, a motor for effecting the movement of said chart, means for varying the speed of said motor in direct proportion to the speed of the ship's engine, and a slidable and pivotally mounted index element operable to register with the course line of said chart upon the operation of the helm, whereby the movement of the ship's rudder may be regulated by the indications upon said chart.

6. In ship-steering mechanism of the class described, the combination with the rudder-operating helm of a ship, of a movable chart, rollers for the reception of said chart, driving means for transferring said chart from one of said rollers to another and disposed to one side of said rollers, said means being responsive to the speed of the ship's engine, an index element movable over the face of said chart, and a rudder-operating helm adapted to have the movements thereof governed by the positions of said element with regard to the chart.

In testimony whereof I affix my signature.

ALBERT E. LARRABEE.